United States Patent [19]
Harnsberger

[11] 3,937,281
[45] Feb. 10, 1976

[54] HIGH LOAD SELF-CLEANING HELICAL SPRING FILTERS

[75] Inventor: Bobby G. Harnsberger, Houston, Tex.

[73] Assignee: Texaco Inc., New York, N.Y.

[22] Filed: June 27, 1974

[21] Appl. No.: 483,504

[52] U.S. Cl. .............. 166/233; 210/350; 210/356; 210/460; 210/497.1
[51] Int. Cl.² ...................... E03B 3/18; B01D 25/34
[58] Field of Search ........................... 166/231–233; 210/106, 350, 356, 359, 456, 460, 488, 497, 497.1, 497 H

[56] References Cited
UNITED STATES PATENTS

| | | | |
|---|---|---|---|
| 1,845,265 | 2/1932 | Getty ................................. | 166/232 |
| 2,569,748 | 10/1951 | DeGrave ...................... | 210/497.1 X |
| 2,754,005 | 7/1956 | Tursky ......................... | 210/497.1 X |
| 2,837,032 | 6/1958 | Horsting, Sr. .................... | 210/356 X |
| 3,385,373 | 5/1968 | Brown ............................... | 166/232 |
| 3,709,293 | 1/1973 | Layne, II et al. .................. | 166/232 |
| 3,712,373 | 1/1973 | Bearden et al. ..................... | 166/232 |
| 3,754,651 | 8/1973 | Lannoch ........................ | 210/356 X |
| 3,805,961 | 4/1974 | Clark et al. ..................... | 219/356 X |
| 3,814,184 | 6/1979 | Allen et al. ...................... | 166/231 X |

FOREIGN PATENTS OR APPLICATIONS

| | | | |
|---|---|---|---|
| 497,928 | 9/1954 | Italy ............................... | 210/497.1 |

*Primary Examiner*—Charles N. Hart
*Assistant Examiner*—Robert H. Spitzer
*Attorney, Agent, or Firm*—T. H. Whaley; C. G. Ries; Theron H. Nichols

[57] ABSTRACT

One of at least two different spring filters comprises a helically grooved hollow mandrel with holes in the grooves and a helical spring closely fitted therearound. The pitch of the spring convolutions is opposite to that of the mandrel grooves so that the mandrel provides lateral support to the spring equivalent to that provided by a solid cylindrical bar for maintaining uniform diameter and concentricity of the spring convolutions while eliminating lateral displacement thereof during high load operations. While this filter is secured at its bottom to the well, a modification requires securing thereof only at its top to the well with a packer. Further, full width spacers are formed on the spring convolutions for precise separation thereof and for preventing twisting and lateral displacement of the individual convolutions and for prevention of any variation of the gauge between the adjacent helical spring convolutions particularly while under magnified loads. One type spacer is a jog in the convolution and another is formed integral thereto.

13 Claims, 7 Drawing Figures

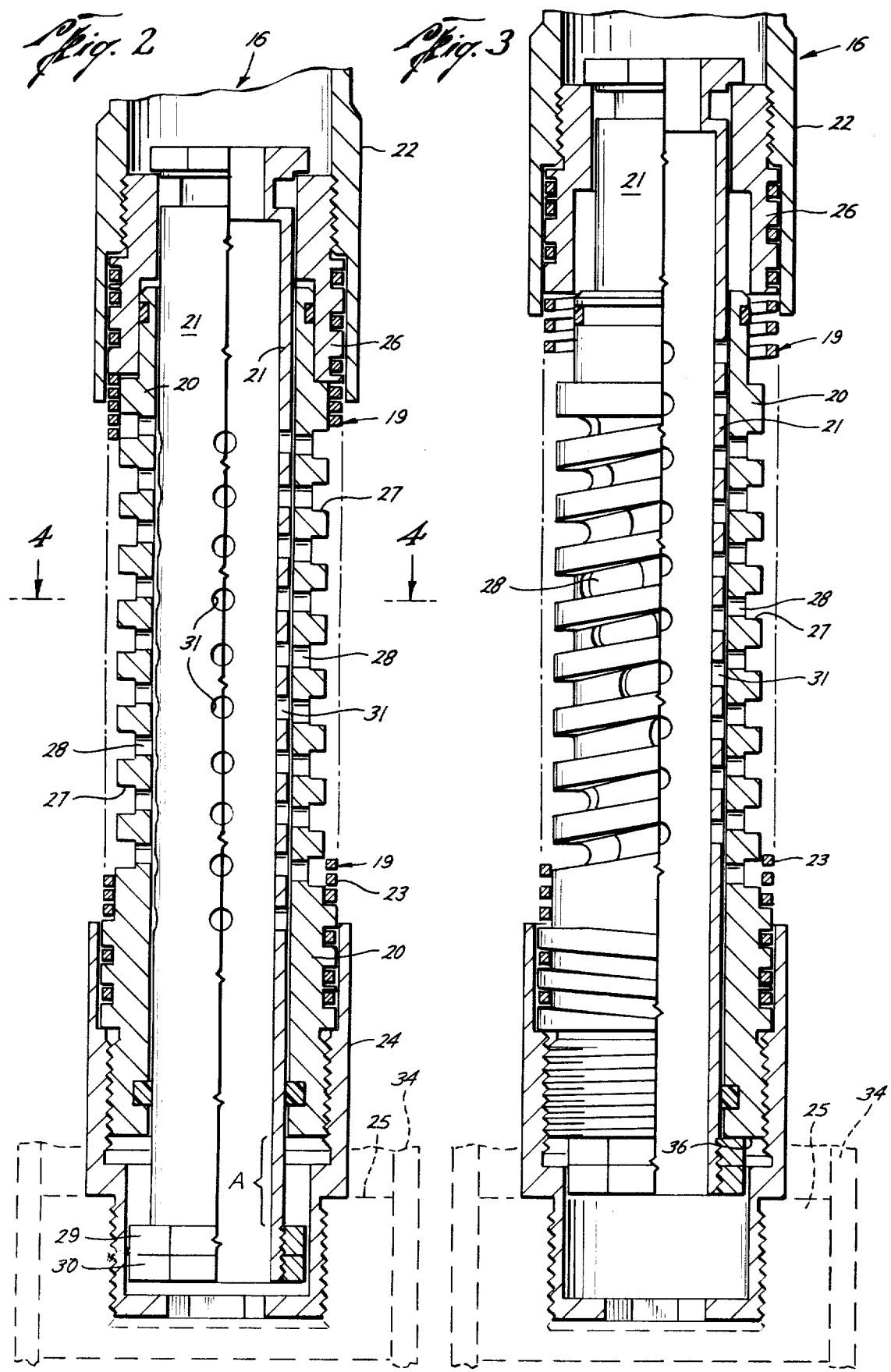

HIGH LOAD SELF-CLEANING HELICAL SPRING FILTERS

BACKGROUND OF THE INVENTION

There are many thousands of oil wells over the surface of the earth and particularly in the United States that are drilled and completed in unconsolidated sand, i.e. crumbly sandstone. In such wells, sand does not necessarily precipitate to the bottom of the well, but instead may remain in suspension and is pumped up, if not free flowing, with the oil. As a result, most mechanical parts as valves, bearings, pistons, cylinders, etc. wear out prematurely under such conditions. Accordingly, the sand must be filtered out from the oil, preferably in the well. Petroleum companies have spent large sums of money in trying to find a suitable solution to the sand problem, but heretofore there has been no satisfactory method or long lasting device for preventing the entry of sand into the tube string and eventually into the suction pipe of the pump, or other works.

One oil well combination foam and wire coil filter is disclosed in U.S. Pat. No. 2,837,032, but that filter is quite sophisticated and expensive to manufacture, and is not adjustable to be opened for backwashing a cleaning liquid, as water, to clean the clogged filter. Another attempted solution was a spring filter as disclosed in U.S. Pat. No. 3,754,651, but because no spacers are apparent between the helical filter elements, the elements would have to be held in slight tension to separate the helical filter elements during filtering. Thus that filter could not be used as an oil well filter on which high compressive loads may be placed. Likewise no guide tube or mandrel can be utilized to strengthen the compressive capabilities for converting the filter to one for use in wells. Also, the spring filter of U.S. Pat. No. 3,179,116 is incapable of being strengthened to use in wells. Any compressive force on the triangular spring elements would cause them to collapse, and further the coined depressions for separating the spring elements would cause the spring elements to flex with a load thereon causing displacement of the adjacent coils and variation of the gauge therebetween.

Accordingly, a new and better method for manufacturing a self-cleaning helical spring filter for mounting on the lower end of a tubing string extending down into a well to a oil containing sand strata and at least two new and better self-cleaning helical spring filters for use in a well are greatly desired and in demand.

OBJECTS OF THE INVENTION

Accordingly, a primary object of this invention is to provide a method for forming a helical spring filter for mounting on the lower end of a tubing string extending down into a well to a liquid containing sand strata that has high production of clean filtered liquids and yet is self-cleaning.

Another primary object of this invention is to provide at least two high strength, self-cleaning helical spring filters that have the equivalent of a solid surface cylindrical inner guide for resisting high differential pressures, for producing a large amount of oil, and for maintaining uniform diameter and concentricity of the spring convolutions.

Yet another primary object of this invention is to provide at least two high strength self-cleaning helical spring filters, each with a cylindrical inner mandrel having a perforated helical groove opposite in pitch to that of the spring convolutions for providing increased flow and increased cleaning action in the filter and for eliminating lateral displacement of the spring convolutions.

A further object of this invention is to provide at least two self-cleaning, twistable helical spring filters for varying the friction between a fixed mandrel guide therein and the spring convolutions therearound for preventing any lateral displacement during normal or high pressure operation.

Another object of this invention is to provide a self-cleaning helical spring filter having jogs precisely formed in the spring convolutions for precise separation thereof and for prevention of twisting and lateral displacement of the adjacent coils and accordingly preventing any variation of the gauge between the adjacent sides of the coils.

A still further object of this invention is to provide a self-cleaning helical spring filter having spacing jogs precisely formed therein the spring convolutions wherein the cross-sectional area of the spring convolutions with the jogs is constant for the complete spring for eliminating any variation in gauge.

Still another object of this invention is to provide a self-cleaning helical spring filter having precisely formed spacers formed on the sides of the spring convolutions for prevention of twisting and lateral displacement of the adjacent coils and accordingly preventing any variation of the gauge between the adjacent sides of the coils.

A further object of this invention is to provide a method and mechanisms for being self-cleanable when filtering crude oil that is easy to operate, is of simple configuration, is economical to build and assemble, and is of greater efficiency for the filtering of sand from the petroliferous sand.

Other objects and various advantages of the disclosed self-cleaning helical spring filter will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, a few forms or mechanisms for carrying out the methods of the invention wherein like reference numerals have been employed to indicate similar parts in the several views in which:

FIG. 2 is a schematic diagrammatic longitudinal cross-sectional view of the self-cleaning helical spring filter in filtering position in a well casing;

FIG. 3 is a schematic longitudinal view of the spring filter of FIG. 2 with parts in section and with the spring convolutions widely separated for the backwash cleaning step;

DESCRIPTION OF THE INVENTION

Figure 1:
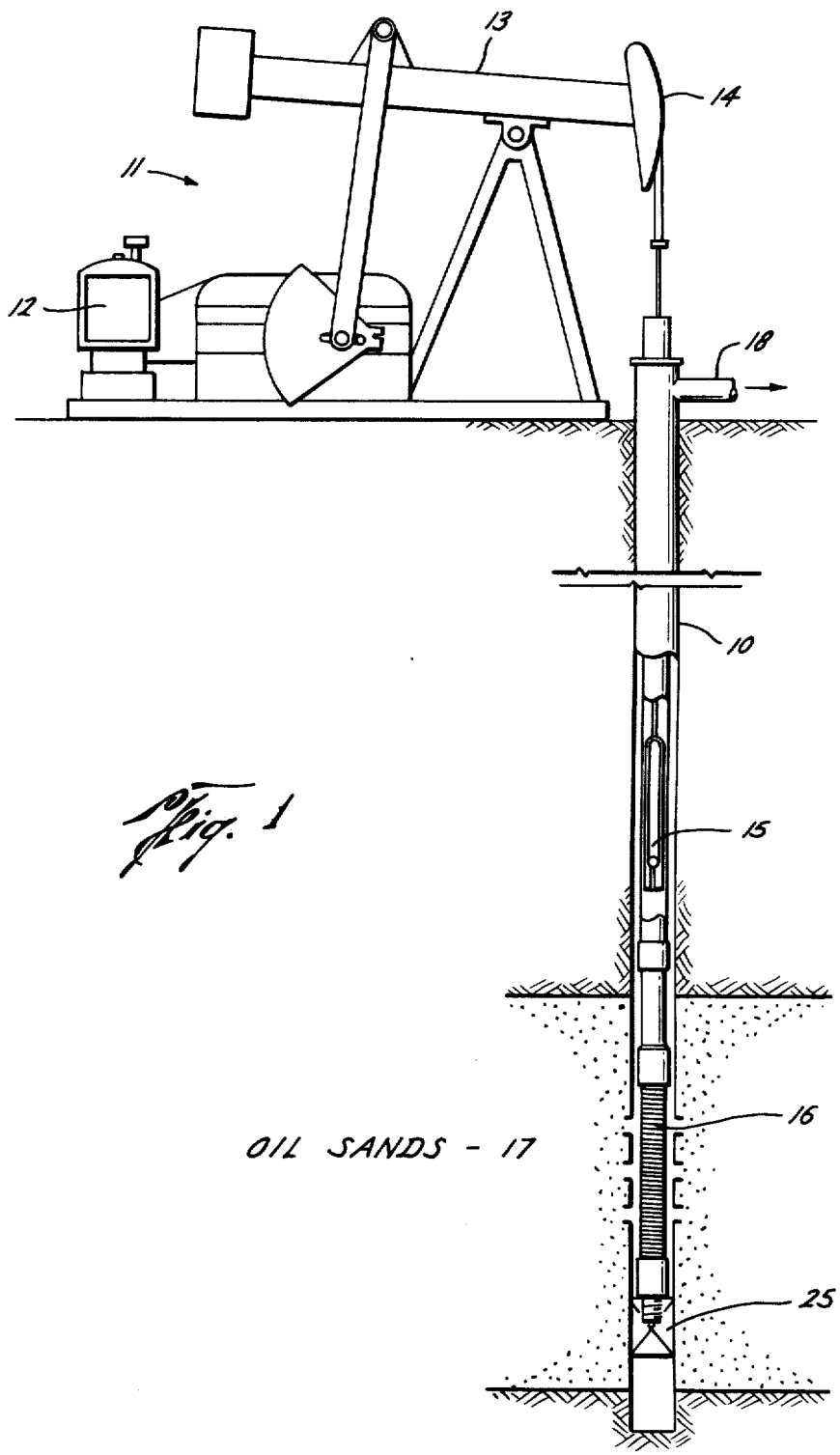
FIG. 1 is a schematic diagrammatic view with parts in section of the new sand filter as mounted in a typical oil well.

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for filtering sand from oil in an oil well and a few mechanisms for filtering sand from oil in the well.

Basically, the method for forming a selfcleaning helical spring filter for mounting on the lower end of a tubing string extending down into a petroliferous unconsolidated sand strata of an oil well, for example, comprises the steps of, 1. forming openings or holes in the grooves of a hollow helically grooved mandrel;

2. forming spacers on one side of the convolutions of a helical spring for leaving a precise spacing between the convolutions when the spring is compressed to filtering position as the sand bearing oil passes from the petroliferous unconsolidated sand strata through the precisely spaced apart helical spring convolutions to filter out the sand pass and on into the helical mandrel grooves, through the mandrel openings into the center of the hollow mandrel, and on up to the tubing string leading to the surface;

3. mounting the helical spring over the hollow helically grooved mandrel with the helical spring convolutions in opposite pitch to the mandrel helical grooves whereby the mandrel provides lateral support to the spacing equivalent to that provided by a solid cylindrical bar for maintaining uniform diameter and concentricity of the spring convolutions while eliminating lateral displacement thereof during high pressure operations;

4. fixedly attaching the lower end of the helical spring to the lower end of the mandrel and securing that lower end to the sides of the well adjacent the sandy petroliferous strata; and 5. extending the other end of the helical spring to spread the spring convolutions for backwashing a spring cleaning liquid, as water, through the hollow mandrel, the mandrel holes, the mandrel grooves, and the spring convolutions for efficient and increased flow of the spring cleaning liquid.

In greater detail of the above method steps, step (1) may include further the step of, a. forming the holes in the grooves in an elongated or slot shape for increased flow of liquids therethrough, whether the liquids be reversed flow backwash liquids or oil being produced from the well.

Basic method step (2) may comprise the following more detailed steps of, a. forming the spacers to the entire thickness of the material of the convolution for prevention of twisting, lateral displacement, and accordingly obviating any variation of the gauge between adjacent sides of the convolutions when fully compressed to filtering position.

Further method step (2) may comprise, a. forming jogs in each convolution as spacers for precise separation of the adjacent convolutions for prevention of twisting, lateral displacement, and accordingly obviating any variation of the gauge between adjacent sides of the convolutions when fully compressed to filtering position.

Method step (2) may be further expanded to read, a. forming jogs in each convolution as spacers for precise separation of the adjacent convolutions for providing that the cross-sectional area of each spring convolution through the jogs is constant for the complete length of the spring, for elimination of any variation in gauge.

Basic method steps (3) and (4) may include the more detailed method steps of, a. twisting or screwing the lower end of the helical spring onto the adjacent lower end of the hollow helically grooved mandrel;

b. twisting or screwing the upper end of the helical spring onto a longitudinal actuator, as the lower end of the tubing string, for expanding the helical spring; and c. varying the amount of twisting of one of the helical spring ends relative to the other spring end for varying frictional contact between the helical spring and the helically grooved mandrel for greater cleaning of the helical spring during backwash cleaning when the helical spring is expanded.

The basic method step (5) may comprise the additional details of, a. compressing the upper end of the helical spring convolutions for leaving a precise spacing between the convolutions for efficient filtering of the sand from the oil in the oil-containing sand strata causing the oil to flow between the spring convolutions, through the mandrel grooves, through the mandrel holes, and up through the hollow mandrel to the tubing string for increased flow capacity of oil through the filter.

While the liquid-containing sands are described as oil carrying sands, obviously the liquid may be any other liquid desired, as water for example.

ARTICLES FOR PERFORMING THE METHODS

Self-cleaning helical spring filters are disclosed in the drawings that may be made by other methods, as by hand.

FIG. 1 is a schematic diagrammatic view of a typical producing oil well 10 having pumping equipment 11 comprising motor means 12 for actuating walking beam 13 with horse head 14 for operating pump 15 in the well. A crude oil pump is utilized after free flow has ceased for raising the oil that has passed through the filter 16 from the petroliferous unconsolidated sand 17 up to the surface to exit from discharge pipe 18. Except for the filter 16, all of the above parts may be conventional elements.

THE PREFERRED EMBODIMENT OF THE INVENTION

FIG. 2 illustrates a schematic enlarged sectional view of the preferred modification of the new self-cleaning helical spring filter 16 for performing the above-described methods. Filter 16 comprises a square helical spring 19 loosely fitted over a hollow mandrel 20 having a perforated inner linear 21 with the latter two elements connected to a vertical motion sleeve actuator or tubing string 22 for expanding and spreading apart the convolutions 23 of the helical spring. In the left half of FIG. 2, the spring 19 and mandrel 20 are cut away to show the inner liner 21, while in the right half of FIG. 2, the inner liner is also cut away with the spring and mandrel.

In the filter 16, FIG. 2, the lower end of the spring 19 is twisted or screwed into helical grooves in the lower end of the mandrel. Screwed onto this mandrel lower end is a bottom fixed sleeve 24 which is threaded into a packer 25 for rigidly securing the lower end of the spring 19 in the casing 34 of the well 10 adjacent the strata of petroliferous unconsolidated sand 17, FIG. 1. The spring 19 lies loosely over the length of the mandrel with the upper end of the spring being twisted or screwed onto an upper cap sleeve 26 splined to the top of the mandrel 20 for being slideable upwardly and downwardly relatively to the mandrel by the vertical motion actuator 22. This actuator 22 is the lower end of the tubing string which extends upwardly to a suitable manual control lever (not sohwn) at the surface for controlling vertical movement of the tubing string for expanding the spring a predetermined amount for cleaning with backwash of a cleaning fluid, as water prior to contraction of the spring to the filtering position.

Figure 4:
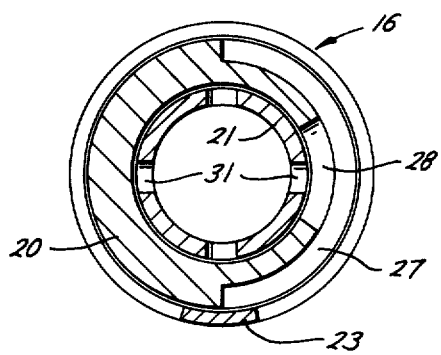
FIG. 4 is a sectional view at 4—4 on FIG. 2.

An important feature of the mandrel 20, FIG. 2, is the helical groove 27 therein, FIGS. 2, 3, and 4, which may be formed larger than the spring elements or spring material of each spring convolution 23, FIGS. 2 and 3, and it has been found that by forming the pitch of the helical groove just opposite to the pitch of the helical spring convolutions, that the helically grooved hollow mandrel acts like a solid surfaced cylinder for supporting the spring 19 against transverse movement, for resisting differential pressures, and for maintaining uniform diameter and concentricity of the spring convolutions.

The grooves 27, FIGS. 2, 3, and 4, of the outer surface of the mandrel 20 have elongated openings or slots 28 therethrough for permitting easy passage of liquids through the mandrel. Grooves 27 may be either square or rounded in shape, depending on the particular design to be manufactured.

The oppositely pitched helical grooves 27 in the mandrel relative to helical spring 19, FIGS. 2 and 3 have three additional important functions over the principal function of providing a support surface for the helical spring equivalent to a solid cylindrical surface:

1. The grooves provide increased flow capacity of liquid through the filter, whether it be production crude oil or backflow cleaning water.

2. The helical grooves provide a swirling and spiral motion of cleaning water for better cleaning of the spring convolutions.

3. The grooves provide a rough surface for improved cleaning of the spring convolutions during relative motion between the grooved mandrel and the spring.

The inner liner 21, FIGS. 2, 3, and 4, limits the extension of the spring 19, FIGS. 2 and 3, for controlling and providing the exact amount of spacing between the individual spring convolutions 23 for backflushing cleaning water therethrough for cleaning the spring. Thus the inner liner 21 is fixedly connected at its upper end to the upper cap sleeve 26, FIG. 2, and accordingly to the upper end of the spring 19 and slideably mounted internally of the mandrel 20. Adjustable nuts 29, 30 are threaded on the lower end of the inner liner which contact the bottom of the mandrel for limiting the exact amount of upward travel of the inner liner and spring upper end for providing the exact amount of separation between the spring convolutions. Holes 31 are formed in four rows in the inner liner, 90° apart and each row being staggered so that at least one set of holes will be substantially opposite a slot 28 in a groove for any position the inner liner is moved axially externally of the mandrel.

Figure 5:
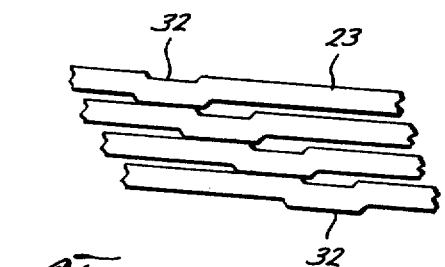
FIG. 5 is a schematic diagrammatic enlarged view of a portion of the spring convolutions illustrating the spacing jogs in each coil.

The material of the spring convolutions 23 of FIGS. 2–6 is formed square in cross-sectional shape. FIG. 5, an enlarged view of a portion of the compressed spring convolutions 23, illustrates the precisely formed jogs 32 spaced at regular intervals along the length of the spring for precise spacing of the convolutions from each other when compressed into sand filtering position, so that only sand-free, clean liquid, as crude oil, is produced from a well extending down into unconsolidated sand. These jogs in the square material of the spring prevent twisting and lateral displacement of the individual convolutions and accordingly prevent any variation of the gauge between the adjacent helical spring convolutions, particularly while under high loads as at the bottom of a string of drill pipe or tubing string in an oil well.

Figure 6:
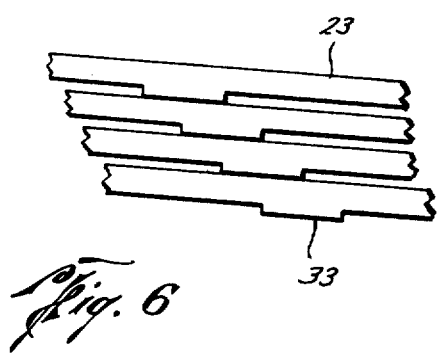
FIG. 6 is a modification of FIG. 5.

FIG. 6, a modification of FIG. 5, discloses integral rectangular spacers 33 formed at regular intervals along the length of the material of the spring convolutions likewise for preventing twisting and lateral displacement of the individual convolutions while under great loads and thus for preventing any variation of gauge between the adjacent helical spring convolutions.

The well has a casing 34, FIGS. 2 and 3, extending down into the petroliferous unconsolidated sand, and which casing is perforated in this area. A packer 25 secures the filter mandrel bottom sleeve 24 to the well casing 34. FIG. 3 illustrates the filter of FIG. 2 stretched to extended or expanded position for backwashing a cleaning liquid, as water, back through the spring convolutions. The spring convolutions 23 are separated by upward movement of the upper cap sleeve 26 by vertical motion sleeve actuator 22 as limited by nuts 29 and 30 on the lower end of inner linear 21. The amount of upward movement required as illustrated by distance A, FIG. 2, is set to provide the proper separation of the convolutions, FIG. 3, for backwash cleaning.

FIG. 4, a sectional view at 4—4 on FIG. 2, illustrates a typical passage for the crude oil, for example, from a well for passing first between the precisely spaced spring convolutions 23, then into grooves 27 in the mandrel 20, then through slots 28 in the grooves, and finally through holes 31 in inner liners 21 for passage internally thereof and upwardly to the surface.

In operation of the self-cleaning helical spring filter 16, FIGS. 2 and 3, after the filter is lowered to its producing level in the petroliferous unconsolidated sand strata, the bottom sleeve 24 of the lower end of the filter is secured in packer 25 so that downward movement, pressure, and force from the vertical motion actuator 22 or from the weight of the tubing string contracts the spring filter until only the accurately formed jogs 32, FIG. 5, or spacers 33, FIG. 6, separate the spring convolutions by a precise amount set to separate the sand from the crude oil in that particular well at that particular level. After a great amount of crude oil production and the filter begins to sand up, the vertical motion actuator is operated from the ground level control to raise the upper sleeve 26 to accordingly expand the spring 19 and the inner liner 21 is raised until its preset stops 29, 30, FIG. 2, contact the bottom 36, FIG. 3, of the mandrel to accordingly permit a predetermined separation of the spring convolutions. A cleaning fluid, as water, is then backwashed through the spring for a predetermined length of time, the vertical motion actuator lowered, and production of sand-free crude oil restored.

Accordingly, a very efficient self-cleaning helical spring filter is disclosed that is operable under heavy loads for crude oil production, for example, at the bottom of a long heavy drill string and which the spring convolutions of square material are supported by the oppositely pitched grooved mandrel for maintaining uniform diameter and concentricity, for preventing twisting and distortion of the convolutions under heavy loads, for providing increased flow of liquids through the filter spring due to the elongated slots in the helical grooves, and for increased cleaning action in the filter as the spring convolutions rub on the grooved mandrel, for resisting high transverse loads, lateral displacement, and differential pressures due particularly to the combination of the square convolutions having the full width precise jogs or spacers and slideable on the helical grooved mandrel of reverse pitch.

Further one of the spring ends may be twisted relative to the other on its mandrel end or upper sleeve cap for varying the friction of the spring as it moves axially on the mandrel.

MODIFIED EMBODIMENT OF THE INVENTION

Figure 7:
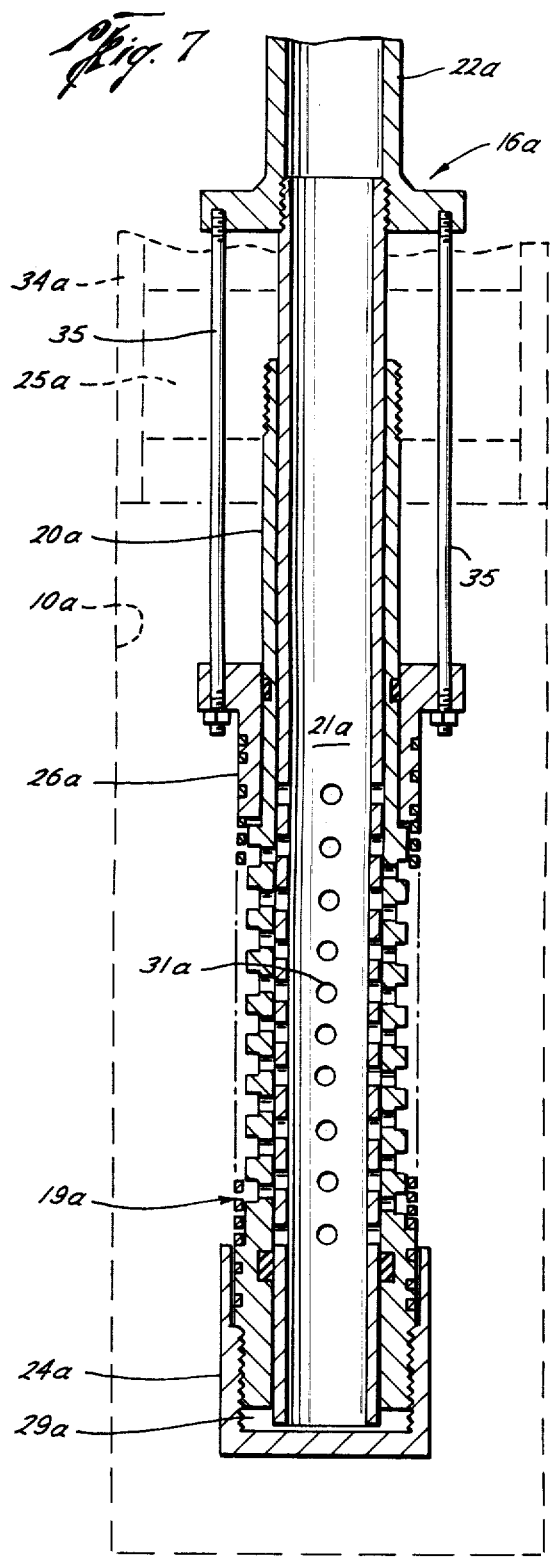
FIG. 7 is a modification of FIG. 2 for a selfcleaning helical spring filter extending below the casing in a well.

FIG. 7, a vertical sectional view, illustrates a modified self-cleaning helical spring filter 16a protruding down below the lower end of a well casing 34a into the petroliferous unconsolidated sand strata. Here a packer 25a is secured in the well 10a in the lower end of casing 34a with the mandrel 20a being fixedly secured to the packer by having its upper end threaded into the packer with the rest of the mandrel extending down into the well.

The filter helical spring 19a, FIG. 7, loosely and slidingly overlies the mandrel with the lower end of the spring being fixedly secured to the mandrel by being screwed onto the lower end of the mandrel and with a bottom sleeve 24a threaded onto the lower end of the mandrel and extending up over the spring lower end to accordingly lock the spring lower end to the mandrel. The upper end of the spring 19a is threaded onto sleeve upper cap 26a which is vertically slideable on the mandrel and fixedly secured to vertical motion sleeve actuator 22a with interconnecting tension rods 35. An inner liner 21a having holes 31a is slideable vertically internally of the mandrel 20a with the inner liner upper end being fixedly connected, as with screw threads, to vertical motion sleeve actuator or tubing string 22a and with the inner liner lower end being slideable to protrude from the lower end of the mandrel. A stop nut 29a is adjustably screwed on the lower end of inner liner 21a for setting the exact amount upward distance that it may travel for expanding the spring convolutions for cleaning. The jogs 32 or spacers 33, FIGS. 5 and 6, respectively, set the precise spacing between the convolutions of the spring 19a when the helical spring filter 16a is in contracted and operative position for filtering the sand from the liquid in the well, as crude oil.

In operation of the modified self-cleaning helical spring filter 16a of FIG. 7, the filter is secured to the packer 25a and extended down below in the casing portion of the well, as an oil well, into the petroliferous unconsolidated sand strata. Here, the vertical motion actuator moves downwardly to fully contract the spring convolutions against their jogs or spacers whereby they are separated by a predetermined and precise distance as defined by the amount of offset of the square cross-section job 32, FIG. 5, or thickness of the rectangular cross-sectioned spacer 33, FIG. 6. After producing sandfree crude oil from the filter until the production level begins to drop off due to the spring convolutions starting to become clogged with sand, the vertical motion actuator or tubing string is activated from the top of the well by being raised to accordingly expand the spring convolutions and to raise the inner liner 21a to its maximum height as determined by its adjustable stop on the bottom thereof. Thus with the spring expanded to the predetermined amount, cleaning liquid, as water, is backwashed through the spring filter 16a. Then the vertical motion actuator 22a is lowered until only the jogs or spacers separate the spring convolutions and crude oil production restarted.

Accordingly, a high strength, high load light self-cleaning helical spring filter is provided that resists differential pressures, maintains uniform diameter and concentricity of the spring convolutions, and has increased flow therethrough and increased cleaning action with the perforated helical grooves of opposite pitch to the spring convolutions. Further, lateral displacement or twisting of the spring convolutions is prevented and any variation of spring gauge is prevented when operating under high loads.

Obviously other methods may be utilized for making the disclosed filters for filtering sand from crude oil in an oil well protruding into a petroliferous unconsolidated sand strata.

Accordingly, it will be seen that the above methods of making self-cleaning helical spring filters and the two disclosed self-cleaning helical spring filters will operate in a manner which meets each of the objects set forth hereinbefore.

While only two mechanisms have been disclosed, it will be evident that various other modifications are possible in the arrangement and construction of the disclosed self-cleaning helical spring filters without departing from the scope of the invention and it is accordingly desired to comprehend within the purview of this invention such modifications as may be considered to fall within the scope of the appended claims.

I claim:

1. A self-cleaning helical spring filter in combination with a tubing string comprising,
   a. a vertically actuatable tubing string having an upper end and a lower end extending down into a well to a liquid-containing sand strata,
   b. helical spring means connected to said lower end of said tubing string having a plurality of coaxial convolutions,
   c. helical grooved hollow elongated mandrel means in frictional contact with the internal surface of said spring means convolutions and connected to a lower end of said helical spring means,
   d. the pitch of said mandrel means grooves being opposite to the pitch of said spring means convolutions, e. said helical spring means having an upper end connected to said tubing string lower end for expanding the helical spring means, and f. holes formed in said mandrel means grooves for providing, when said spring means is expanded, increased cleaning action, increased flow of production liquids through the helical spring filter, and increase resistance to lateral forces on the spring.

2. A self-cleaning helical spring filter as recited in claim 1 wherein,
   a. said helical spring means is twistably mounted on said mandrel means for varying said frictional contact between said helical spring means and said mandrel means as said vertically actuatable tubing string operates said helical spring means over said mandrel means for improved backwash cleaning of said helical spring means.

3. A self-cleaning helical spring filter as recited in claim 1 comprising further,
   a. perforated inner liner means for said mandrel means for limiting the maximum distance that said spring means may be expanded axially of said coaxial convolutions for backwashing cleaning liquids through the expanded spring for cleaning said spring means convolutions.

4. A self-cleaning helical spring filter as recited in claim 1 wherein,
   a. said lower end of said helical spring means is secured to the well adjacent the liquid contained sand strata, and
   b. said upper end of said helical spring means is connected to said tubing string lower end for being expanded thereby for backwashing cleaning liquids through the spaced apart convolutions.

5. A self-cleaning helical spring filter as recited in claim 1 wherein,
   a. said helical spring means has a plurality of precisely formed spacers formed on one side of each convolution, and
   b. each of said spacers being formed to the entire thickness of the material of the convolution for prevention of twisting, lateral displacement, and accordingly obviating any variation of the gauge between adjacent sides of the convolutions when fully compressed under heavy loads to sand filtering position.

6. A self-cleaning helical spring filter as recited in claim 5 wherein,
   a. said spacers are jogs precisely formed on each convolution for precise separation of the adjacent convolutions when in fully compressed and operative position.

7. A self-cleaning helical spring filter as recited in claim 5 wherein,
   a. said spacers are jogs precisely formed in said spring convolutions for ensuring that the crosssectional area of each spring convolution through the jogs is constant for the length of the spring for elimination of any variations in gauge.

8. A self-cleaning helical spring filter as recited in claim 5 wherein,
   a. the material of each of the spring convolutions has a square cross-section, and
   b. each of said spacers has a square crosssection and a width equal to the width of the square material of the spring convolutions.

9. A self-cleaning helical spring filter as recited in claim 5 wherein,
   a. said helical spring means is responsive to said vertically actuatable tubing string for compressing said helical spring convolutions to sand filtering position, and
   b. said helical spring means is responsive to said vertically actuatable tubing string for causing the liquid to flow between the spring convolutions, through the mandrel grooves, through the mandrel holes, and up through the hollow mandrel to the tubing string for more efficient filtering of the sand from the liquid in the liquid-containing sand strata.

10. A self-cleaning helical spring filter as recited in claim 1 wherein,
    a. packer means is secured in the well,
    b. said elongated mandrel means having a lower end extending below said helical spring means, and
    c. connecting means for interconnecting said lower end of said mandrel means with said packer means.

11. A self-cleaning helical spring filter as recited in claim 1 wherein,
    a. packer means is secured in the well,
    b. said elongated mandrel means having an upper end extending above said helical spring means, and
    c. connecting means for slideably interconnecting said upper end of said mandrel means with said tubing string lower end.

12. A self-cleaning helical spring filter in combination with a tubing string comprising,
    a. a vertically actuatable tubing string having an upper end, and a lower end extendable down into a well to a liquid-containing sand strata,
    b. helical spring means having a plurality of coaxial convolutions,
    c. helical grooved hollow elongated mandrel means in frictional contact with the internal surface of said spring menas conbolutions and connected to a lower end of said helical spring means,
    d. the pitch of said mandrel means grooves being opposite to the pitch of said spring means convolutions,
    e. said helical spring means having an upper end connected to said tubing string lower end for expanding the helical spring means,
    f. holes formed in said mandrel means grooves for providing, when said spring means is expanded, increased cleaning action, increased flow of production liquids through the helical spring filter, and increased resistance to lateral forces on the spring,
    g. perforated inner liner means for said mandrel means for limiting the maximum distance that said spring means may be expanded for backwashing cleaning liquids through the expanded spring for cleaning said spring means convolutions,
    h. said inner liner means comprises a perforated tube slideable axially and internally of said mandrel,
    i. an upper end of said slideable perforated tube being connected to the upper end of said helical spring means,
    j. a lower end of said slideable perforated tube having stop means for limiting the upward travel of both said tube and said upper end of said helical spring means.

13. A self-cleaning helical spring filter in combination with a tubing string comprising, a. a vertically actuatable tubing string extendable down into a petroliferou unconsolidated sand strata of an oil well,
b. a helical spring having upper and lower ends, said lower end of said helical spring being fixed to said well adjacent to said petroliferous sand strata and said upper end of said helical spring being connected to said vertically actuatable tubing string for expanding said spring,
c. a hollow perforated mandrel having two ends mounted in touching contact with the internal surface of said spring and one of said ends of hollow perforate mandrel being connected to said lower end of said spring,
d. one of said mandrel ends being connected to said well adjacent to said petroliferous sand strata,
e. said hollow mandrel having helical grooves in the outer surface thereof, the pitch of said helical grooves being opposite to the pitch of said helical spring, and
f. said hollow mandrel having a plurality of spaced apart holes in each of said helical grooves for providing, when the spring is expanded, increased cleaning action for providing a greater amount of flow through the helical spring, the grooves, and the holes, and for providing high resistance to lateral forces.

* * * * *